United States Patent
Guerin et al.

(10) Patent No.: US 7,330,435 B2
(45) Date of Patent: Feb. 12, 2008

(54) METHOD AND SYSTEM FOR TOPOLOGY CONSTRUCTION AND PATH IDENTIFICATION IN A ROUTING DOMAIN OPERATED ACCORDING TO A LINK STATE ROUTING PROTOCOL

(75) Inventors: Roch Guerin, Newtown Square, PA (US); Rajendran Rajan, Philadelphia, PA (US)

(73) Assignee: Iptivia, Inc., Philadelphia, PA (US)

( * ) Notice: Subject to any disclaimer, the term of this patent is extended or adjusted under 35 U.S.C. 154(b) by 1092 days.

(21) Appl. No.: 10/077,245

(22) Filed: Feb. 15, 2002

(65) Prior Publication Data

US 2003/0072485 A1  Apr. 17, 2003

Related U.S. Application Data

(63) Continuation-in-part of application No. 09/977,420, filed on Nov. 29, 2001, now Pat. No. 6,836,465.

(51) Int. Cl.
*H04L 12/28* (2006.01)

(52) U.S. Cl. ............... 370/238; 370/235; 370/255; 370/389; 370/401; 709/238; 709/241

(58) Field of Classification Search ........... 370/235, 370/238, 229, 238.1, 351, 254, 389, 401, 370/251, 252, 218, 255; 709/241, 238

See application file for complete search history.

(56) References Cited

U.S. PATENT DOCUMENTS

| | | | |
|---|---|---|---|
| 4,939,726 A | 7/1990 | Flammer | |
| 5,101,348 A | 3/1992 | Arrowood et al. | |
| 5,115,433 A | 5/1992 | Baran | |
| 5,309,433 A | 5/1994 | Cidon | |
| 5,317,566 A | 5/1994 | Joshi | |
| 5,323,394 A | 6/1994 | Perlman | |
| 5,365,523 A | 11/1994 | Derby et al. | |
| 5,398,012 A | 3/1995 | Derby et al. | |
| 5,497,368 A * | 3/1996 | Reijnierse et al. | 370/351 |
| 5,687,168 A | 11/1997 | Iwata | |
| 5,754,790 A * | 5/1998 | France et al. | 709/238 |
| 5,831,975 A * | 11/1998 | Chen et al. | 370/256 |
| 5,854,899 A * | 12/1998 | Callon et al. | 709/238 |
| 5,930,259 A | 7/1999 | Katsube | |
| 6,003,090 A | 12/1999 | Puranik et al. | |

(Continued)

OTHER PUBLICATIONS

U.S. Appl. No. 09/977,420, Guerin.

(Continued)

*Primary Examiner*—Edan Orgad
*Assistant Examiner*—Venkatesh Haliyur
(74) *Attorney, Agent, or Firm*—Pepper Hamilton LLP

(57) ABSTRACT

A method and system for extracting and building end-to-end route information in a multi-area Internet protocol (IP) autonomous system (AS) operated according to a link state routing protocol such as the Open Shortest Path First (OSPF) protocol is disclosed. The method and system enables a user, such as a network administrator, to explicitly identify a full set of paths (links and routers) that a given IP packet would potentially traverse from its entry point in the area of the AS where it originates until its exit point in its intended destination or exit area.

16 Claims, 10 Drawing Sheets

U.S. PATENT DOCUMENTS

| | | | |
|---|---|---|---|
| 6,023,501 | A | 2/2000 | Wakamatsu |
| 6,028,857 | A * | 2/2000 | Poor .......................... 370/351 |
| 6,078,590 | A * | 6/2000 | Farinacci et al. ........... 370/432 |
| 6,097,718 | A | 8/2000 | Bion |
| 6,108,710 | A | 8/2000 | Brabson |
| 6,119,170 | A | 9/2000 | Schoffelman |
| 6,205,146 | B1 | 3/2001 | Rochberger |
| 6,222,839 | B1 | 4/2001 | Nakazaki et al. |
| 6,393,486 | B1 * | 5/2002 | Pelavin et al. .............. 709/238 |
| 6,532,212 | B1 * | 3/2003 | Soloway et al. ........... 370/230 |
| 6,711,152 | B1 * | 3/2004 | Kalmanek et al. .......... 370/351 |
| 2002/0064132 | A1 * | 5/2002 | Akyol et al. ................ 370/250 |
| 2002/0141342 | A1 * | 10/2002 | Furman et al. ............. 370/235 |
| 2003/0179742 | A1 * | 9/2003 | Ogier et al. ................ 370/351 |

OTHER PUBLICATIONS

J.D. Case, et al., "Simple Network Management Protocol", Internet Engineering Task Force, Request for Comments No. 1157, http://www.ietf.org/rfc/rfc1157.txt, May 1990.

Cisco Systems, "NetFlow FlowCollector 3.0 Documentation", http://www.cisco.com/warp/public/732/Tech/netflow/, 1986-1999.

Juniper Networks, "Juniper Networks cflowd documentation", http://arachne3.juniper.net/products/network_mgmt_refs.html, Apr. 1998.

J. Moy, "OSPF Version 2", Internet Engineering Task Force, Request for Comments No. 2328, http://www.ietf.org/rfc/rfc2328.txt, Apr. 1998.

* cited by examiner

FIG. 9  Representative Computer
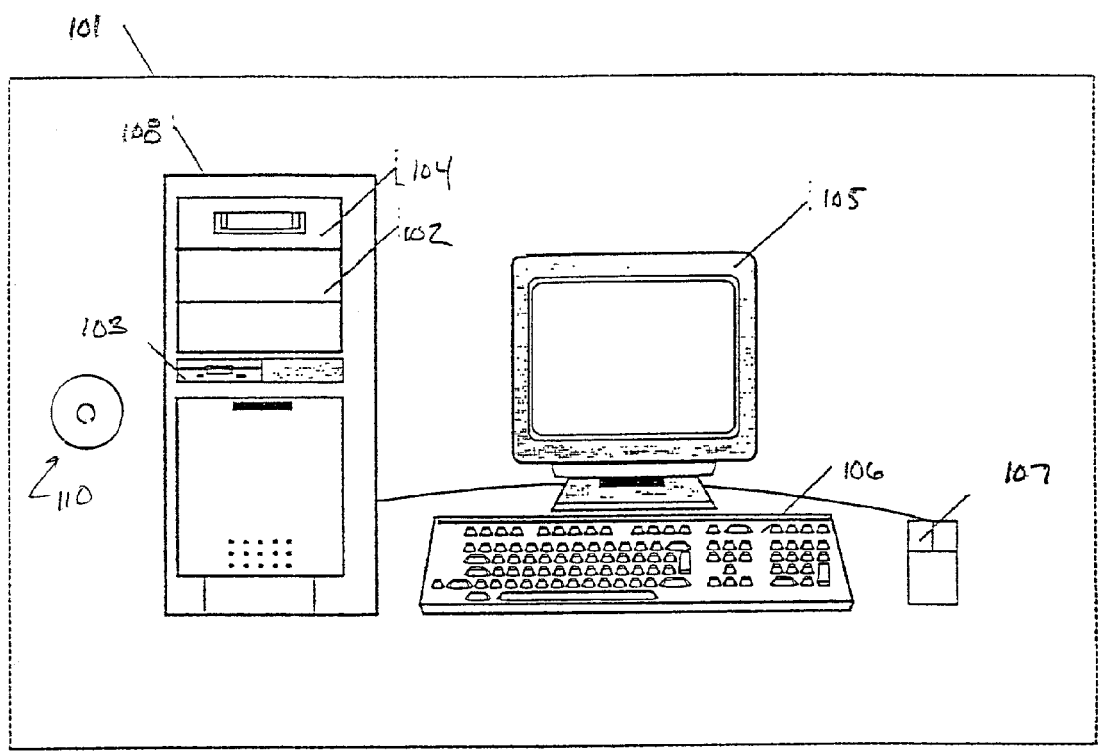

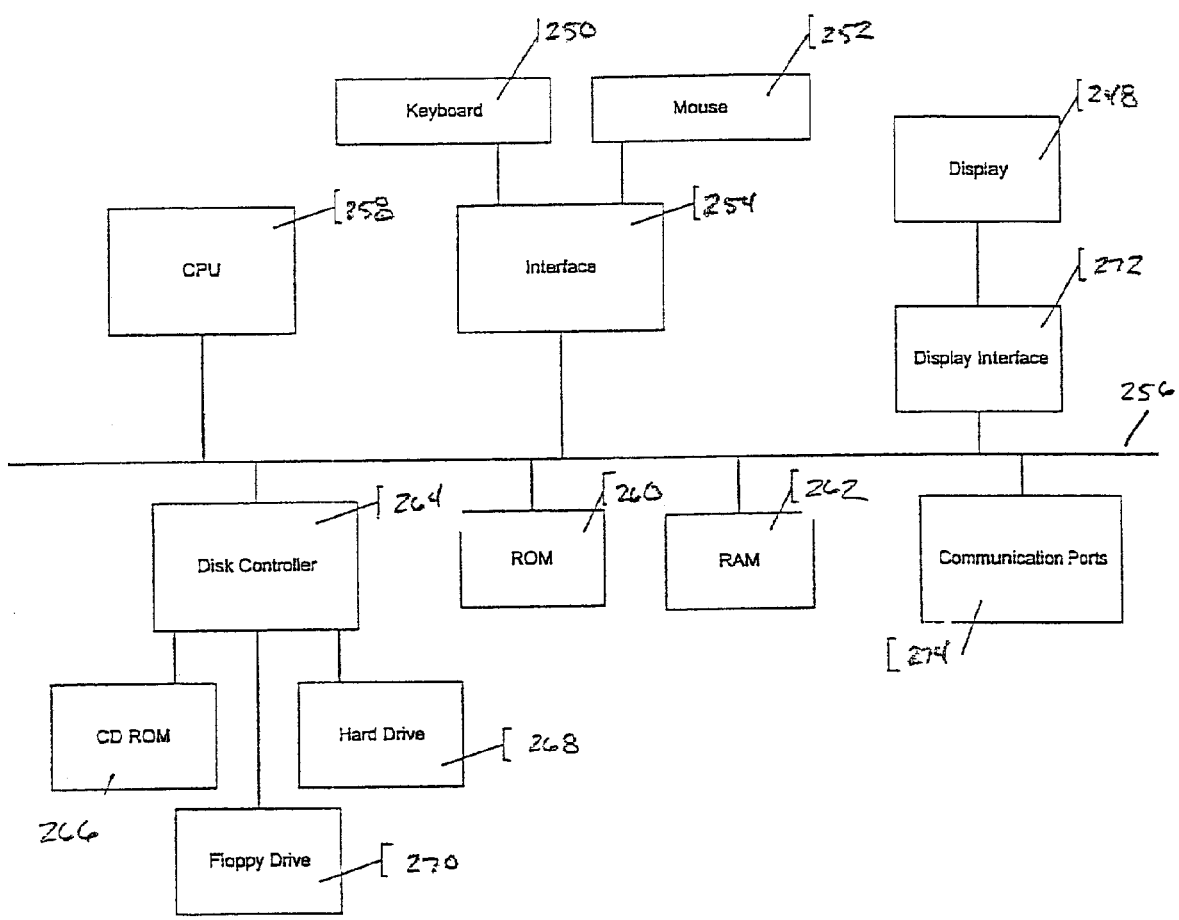
FIG 10 Computer System Internal Diagram

METHOD AND SYSTEM FOR TOPOLOGY CONSTRUCTION AND PATH IDENTIFICATION IN A ROUTING DOMAIN OPERATED ACCORDING TO A LINK STATE ROUTING PROTOCOL

RELATED APPLICATIONS

This application claims priority to, and is a continuation-in-part of, U.S. patent application Ser. No. 09/977,420, filed Nov. 29, 2001, now U.S. Pat. No. 6,836,465 which is incorporated herein by reference in its entirety.

FIELD OF THE INVENTION

The present invention relates generally to a method and system for acquiring information from an Internet Protocol (IP) routing domain operating according to a link state routing protocol such as the Open Shortest Path First (OSPF) protocol. More particularly, the present invention relates to a method and system for determining the set of links and routers that are traversed by traffic to and/or from an individual user in a communications network where routing is determined according to a link state routing protocol, such as the Open Shortest Path First (OSPF) protocol.

BACKGROUND OF THE INVENTION

An Internet protocol (IP) network is a large distributed system in which individual routers automatically adjust their decisions on how to forward packets based on information they learn from their neighbors about the state of the network. This design permits rapid recovery in case of link or router failures by allowing affected routers to re-route packets around the failure as soon as they discover it. The Open Shortest Path First (OSPF) routing protocol is a commonly used embodiment of this design.

However, the distributed mode of operation of routing protocols such as OSPF makes it difficult for a network administrator to have a global view of the network at any given time. Because of this, many of the network management functions that are available for networks based on more traditional technologies, e.g., connection-oriented such frame relay or asynchronous transfer mode (ATM), are difficult if not impossible to replicate in IP networks. For example, in a connection-oriented network, the state associated with each connection/user provides the network administrator with a ready handle for tracing its path and monitoring the resources it relies on. In contrast, in IP networks, because routing decisions are made in a distributed fashion by many routers that are only concerned with local packet forwarding decisions, there is no single entity with complete knowledge of the entire path that a packet will follow at any given time. This makes it difficult for a network administrator to precisely identify the path that the traffic between, for example, two customer sites, is following when traversing the network.

As a consequence, upon identifying a highly congested link, a network administrator has no or only limited visibility into which customers may be experiencing poor performance as a result of this congestion. Similarly, in the presence of a link failure, identifying which customers are immediately affected as well as predicting which ones may also experience a change in service performance shortly after the failure is again a very complex task in IP networks.

Management tools do exist for IP networks, but they are typically reactive or operate at a coarse granularity, i.e., not at the level of the end-to-end performance of an individual customer or site. For example, routers typically support standard Management Information Bases (MIBs) that can be queried using protocols such as the Simple Network Management Protocol (SNMP). MIBs provide detailed state information about individual routers, e.g., interface status, number of packets or bytes transmitted and received on each interface, etc. However, this information is local to each device, and does not offer a network wide perspective. Furthermore, piecing together MIB information from multiple routers to derive end-to-end performance measures of relevance to a given customer is not an easy task. A similar limitation exists when relying on traffic monitoring information that is routinely gathered at routers using mechanisms such as Cisco's NetFlow™ or Juniper cflowd™. These monitoring devices capture detailed information about the traffic crossing a given interface, but again do not have the ability to identify end-to-end paths. Converting such traffic monitoring data into end-to-end intelligence is a laborious task.

A few tools exist that are capable of end-to-end sampling of paths traversing an IP network. Most of them are based on two core utilities built into the Internet Protocol, ping and traceroute, which allow a network administrator to probe the network in order to generate estimates of end-to-end performance measures such as packet loss and delay, and record full path information. However, solutions based on utilities such as ping and traceroute often are not desirable because they are neither scalable nor capable of providing real-time information about the network behavior as a user experiences it.

Accordingly, it is desirable to provide an improved method and system for monitoring, tracking, and/or predicting the distributed routing state of an IP network, and in particular IP networks where the routing state is determined based on a link state routing protocol such as the OSPF protocol.

The following is provided as additional background information about the Internet and Internet routing protocols to help the reader understand the context of the present invention:

The Internet is a global network that consists of multiple interconnected smaller networks or Autonomous Systems (AS) also called routing domains. The delivery of packets across this Interconnection of Networks is carried out under the responsibility of the IP suite. In particular, routing protocols such as OPSF disseminate the state of the network (which links/routers are up or down) to enable network nodes to determine how best to forward packets towards their destination.

Internet routing protocols can be divided into intra-domain and inter-domain protocols, with inter-domain protocols communicating information between ASs, while intra-domain protocols are responsible for determining the forwarding of packets within each AS. The OSPF protocol is an example of an intra-domain protocol. This general architecture and the associated suite of protocols are rapidly becoming the de facto technology on which modem communication networks are built. This dominance extends from simple local area networks to large-scale, international carrier networks, and is largely due to the robustness and efficiency of networks built using it. In particular, IP networks are often referred to as "connectionless", and the delivery of data packets to their intended destination is performed through a number of "independent" decisions made by the routers to which a packet is being forwarded.

SUMMARY OF THE INVENTION

It is therefore a feature and advantage of the present invention to provide an improved method and system for monitoring, tracking, and/or predicting the routing path of one or more packets crossing a routing domain operated according to a link state routing protocol, such as the OSPF protocol.

In accordance with one embodiment of the present invention, a method for constructing topology and routing information in a multi-area routing domain that is operated according to a link state routing protocol includes several steps. The steps include: (i) acquiring topology and routing information, including route entries, for each area in the routing domain; (ii) identifying, within each area of the routing domain, possible exit points for all route entries known in each area in the routing domain; (ii) for all exit points identified in the identifying step as being associated with a route entry, determining a cost of a path between the exit point its associated route entry; and (iv) for all exit points identified in the identifying step, determining other areas, if any, to which said exit points connect.

In accordance with an alternate embodiment of the invention, a method for constructing end-to-end paths in a multi-area routing domain that is operated according to a link state routing protocol includes the steps of: (i) acquiring topology and routing information for a routing domain; (ii) determining an entry point in an origin area located in the routing domain; (iii) retrieving a route entry in the origin area, the route entry being associated with a specified destination; (iv) extracting a set of exit points in the origin area through which the route entry can be reached; (v) for each exit point extracted in the extracting step, determining a total cost of reaching the route entry from the entry point via the exit point; (vi) eliminating, from the set of exit points, those exit points that do not correspond to minimum total costs; and (vii) identifying paths associated with the exit points through which the route entry is directly reachable, and eliminating those exit points from the set of exit points.

Optionally, in this embodiment the step of determining a total cost of reaching the route entry from the entry point via the exit point includes the computation shortest paths in the origin area between the entry point and each of the exit points, the determination of first cost for each of the shortest paths, the determination of a second cost for reaching the route entry from each of the exit points, and for each of the exit points, the addition of the first cost and the second cost to yield a total cost. Under this option, the computing step may be performed based on how the route entry corresponding to the specified destination address was entered in a route table for the area.

Also optionally, where a next area is not required to reach the specified destination from at least one of the exit points, the identifying step may include identifying a path to the specified destination.

Further, the method may include the steps of identifying next areas connected to the exit points remaining in the set of exit points, and, for each remaining exit point, extending at least one path from the origin area into at least one next area connected to the exit point. With this embodiment, the step of identifying at least one next area connected to an exit point may include: (i) determining a type of the route entry associated with the specified destination in a current area (i.e., the area within which the exit point resides); (ii) for route entries having a type that is not local to the current area, retrieving a set of areas associated with the exit point; (ii) from the set of areas associated with the exit point, identifying areas that are not represented in any path that has been followed to reach said exit point, and for such areas retrieving the route entry associated with the specified destination; and (iv) determining the type of route entries that have been retrieved and, based on the route entry type, determining whether to select the area for extending the path from the associated exit point. Also, this embodiment may also include the steps of (i) selecting at least one of the next areas from a current area (i.e., the area within which an exit point to the next area resides); (ii) retrieving a route entry in at least one of the next areas, where the route entry is associated with the specified destination; (iii) extracting from the next area or areas a set of next area exit points through which the route entry can be reached; (iv) for each next area exit point, computing a total cost of reaching the route entry from that next area exit point; (v) eliminating from the set of next area exit points those next area exit points having shortest paths that do not correspond to minimum total costs; and (vi) identifying the shortest paths associated with the next area exit points remaining in the set of next area exit points. destination.

The extracting step may be performed by accessing a route table maintained for each area. In such a case, each route table may contain a set of route entries known in the area and, for each route entry, a corresponding set of exit points and data relating to how the exit points were learned. Also, route entries may be added to the route table of an area based on the advertisements received from that area. For each route entry added to the route table of an area, the route table may also store at least one route type based on the advertisements through which the route was learned, as well as (or alternatively) for each route type of the route entry a set of associated exit points. For each route type of a route entry added to the route table of an area, the identity of the exit points to be stored may be based on the advertisement through which the route was learned.

In accordance with an alternate embodiment of the invention, a computer-readable medium may contain instructions thereon for instructing a computing device to perform a method of constructing end-to-end paths in a multi-area routing domain operated according to a link state routing protocol, wherein the method comprises any or all of the steps described above.

There have thus been outlined the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 9 illustrates an exemplary computing device and carrier.

FIG. 10 is an internal hardware diagram of the computing device of FIG. 9.

DETAILED DESCRIPTION OF PREFERRED EMBODIMENTS OF THE INVENTION

A preferred embodiment of the present invention provides an improved method and system for monitoring, tracking, and/or predicting the routing path of one or more packets under the Open Shortest Path First (OSPF) or an analogous IP protocol.

The present invention allows a network administrator, network monitoring system, or other human or automated user to identify the path or paths followed or expected to be followed by any packet traveling though a routing domain or AS, where the packet has a known entry point or address and a known or anticipated destination address. The destination address is associated with a routing entry, typically from a routing table, and the present invention constructs the path that was or is expected to be followed through the routing domain by the packet associated with the routing entry. Optionally and preferably, when more than one path is possible, the invention is capable of constructing the complete set of possible paths, any of which the packet may follow.

Figure 1:
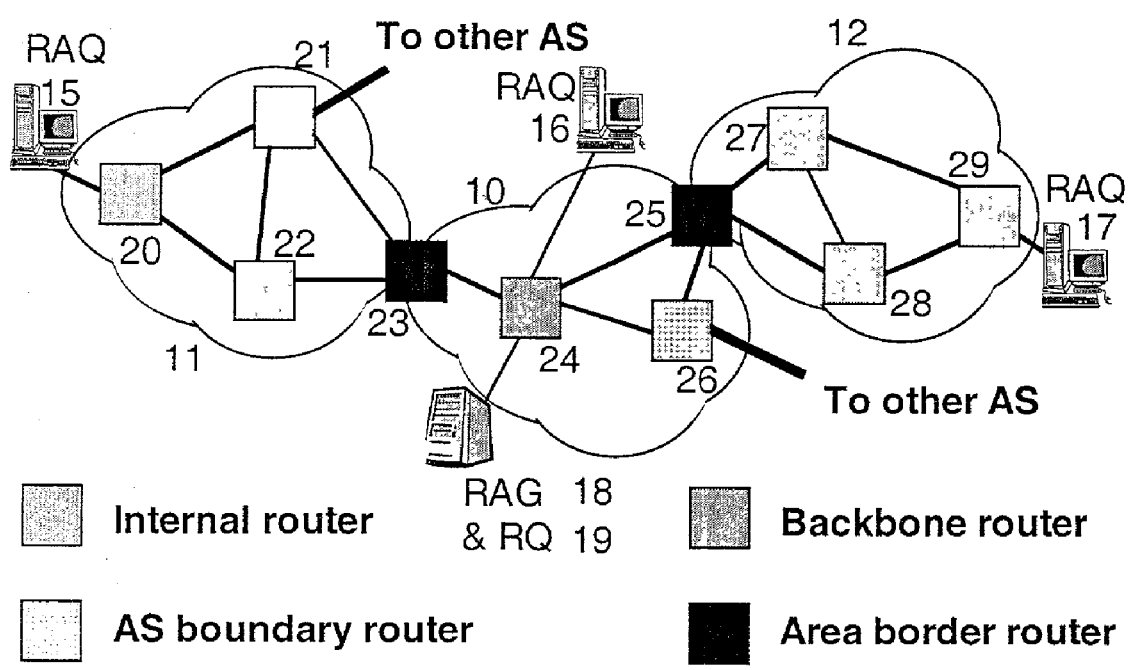
FIG. 1 illustrates an exemplary AS, or routing domain, where the present invention may be applied, including various elements of the AS such as areas, different types of routers, route acquisition modules, a route aggregation module, an a route query module.

FIG. 1 illustrates an exemplary AS, or routing domain, where the present invention may be applied. The domain illustrated in FIG. 1 is not, of course, the only domain configuration in which the invention may apply, but it is only intended to serve as an illustration of one possible domain. Referring to FIG. 1, the illustrated AS includes three areas 10, 11, and 12. The present invention may also be used with an AS having more than three or fewer than three areas. Routing in the AS is performed according to a link state routing protocol, preferably the open shortest path first (OSPF) routing protocol. In OSPF or an analogous protocol, area 10 corresponds to the "backbone" area that is used to connect other areas in the AS. In OSPF, the backbone area is denoted as "Area 0" and all traffic originating in a given area and destined to a destination located in or reachable from another area is routed trough the backbone area. In other words, the routing protocol assumes a "spoke and hub" configuration, where the backbone area is the hub through which flows all traffic between other areas (spokes). Such a configuration is assumed in the context of this preferred embodiment, but it should be clear that the methods presented here can be readily adapted to more general configurations, for example involving multiple levels.

Within an area packets are routed along shortest paths, where shortest paths are computed according to configured link weights (metrics). Each area typically includes a plurality of routers 20 to 29 that direct and transport packet traffic between each other within and between areas, as well as to and from external routers in other ASs. According to the OSPF terminology, routers can be classified into: (1) internal routers 20, 22, 27, 28, 29 that route information to and from other routers that are associated with a single area; (2) area border routers 23, 25 which serve as routers for two or more areas within the AS and provide for the passage of traffic from one area 11 to the backbone area 10 and vice-versa; (3) backbone routers 23, 24, 25, 26 that have at least one interface in the backbone area (note that area border routers are backbone routers, but that the converse does not always hold); and (4) AS boundary routers 21, 26, which serve as exit and/or entry points to and from the AS.

In accordance with the present invention, the AS includes one or more Route AcQuisition (RAQ) modules 15, 16, and 17. Typically, there is one RAQ module for each area of the AS, although it is possible that an area may have no RAQ module or more than one RAQ module. The RAQ modules, which preferably have the features of a routing device, essentially serve as "stub-routers" and participate in the routing protocol of their respective area. This allows them to receive much or all of the routing information exchanged between routers in their area. In the context of OSPF, this information takes on different forms depending on whether it pertains to routes within the router's area, routes located in other areas, or external routes that belong to another AS.

Within an area, the information that is advertised by routers typically consists of router and network link state advertisements (LSAs), which allow all routers in an area to build a complete "map" of their area. This map specifies the identity of all the routers belonging to the area together with the set of route entries they can reach, and the "cost" associated with each one of their links. The availability of such a map enables routers in the area to compute shortest or least cost paths to any route entry located in the area. This is preferably accomplished through the use of the Dijkstra shortest path algorithm that is run on the graph constructed from the area map available at each router. For example, referring to area 11 in FIG. 1, if the cost of the links between all pairs of routers are taken equal to one, then the least cost path for a packet to travel from RAQ module 15 to router 21 would be via router 20 and would have a cost of two, since it takes two "hops" to reach the destination: a first hop to router 20 and a second hop to router 21. Alternatively, if the cost of the link between router 20 and router 21 were, for example, three, then the total cost for the packet to travel from RAQ module 15 to router 21 through router 20 would be one plus three, which is four, and therefore not the least cost path to reach router 21. The least cost path is now through routers 20 and 22 for a total cost of three to reach router 21.

Providing the same level of detailed topology and cost information for routes entries located in other areas or in a different AS would not be practical for scalability reasons. As a result, the OSPF protocol specifies a different approach for advertising within an area routing information for remote destinations. Routers connected to other areas, i.e., area border routers such a 23 and 25 in FIG. 1, are responsible for summarizing routing information they learn from belonging to other areas. The summary information that is advertised is in the form of summary link state advertisements, which provide the cost of reaching remote route entries through the advertising area border router. For example, area border router 25 in FIG. 1 summarizes routing information pertaining to area 12 and advertises it in area 10 to which it also belongs. In other words, rather than simply forwarding to routers 24 and 26 in area 10 the link state advertisements it receives from routers in area 12, router 25 puts together a summary of all the routing information it has learned about routing entries in area 12, and forwards this summarized information to routers 24 and 26 in area 10. Specifically, assuming again unit cost for all links between routers, router 25 would advertise a cost of one (1) for route entries reachable from routers 27 and 28, and a cost of two (2) for route entries reachable from router 29. These correspond to the cost of the least cost paths between router 25 and route entries associated with those routers. Similarly, area border router 23 constructs routing summaries for all remote route entries it can reach and advertises them in area 11. Those routing summaries combine the information that router 23 learns directly from belonging to area 10 with summary information it receives from other areas, e.g., the summary information for area 12 advertised by router 25. In particular, router 23 advertises into area 11 a cost of four (4) for reaching route entries associated with router 29 in area 12. This result is the combination of the cost of two (2) advertised by router 25 in the summary link state advertisements (LSAs) it transmits in area 10, and the cost of two (2) for reaching router 25 from router 23. Router 23 is capable of computing this latter cost because of its participation in area 10. Note that this is also similar to the IS-IS extensions proposed in RFC 2966 and in the IETF Draft entitled "IS-IS Extensions for Traffic Engineering" currently under discussion in the IS-IS IETF Working Group, so that the description of this preferred embodiment would also apply to such an environment with only minor modifications.

Advertising of routing information for routing entries located in another AS is done somewhat differently from that of routing entries located in other areas. Specifically, routers that connect to another AS, i.e., AS boundary routers such as routers 21 and 26 in FIG. 1, are responsible for transmitting AS-external link state advertisements that are propagated throughout the entire AS, i.e., forwarded unchanged to all routers in all areas. Those advertisements provide all routers in the AS with the identity of AS-boundary routers, the set of external routes that each AS-boundary router can reach, and for each such route the cost for reaching it from the AS-boundary router. Routers are then able to compute the least cost path to external routes by concatenating the cost advertised by the AS-boundary routers for the external route with the cost of reaching the AS-boundary router itself. A router can readily compute the latter when the AS-boundary router is in the same area, as it knows the identity of all routers in its area. For AS-boundary routers located in other areas, the cost of reaching them is also available as individual route entries are created for each AS-boundary router by area border routers when they create their summary advertisements. This ensures that all routers are able to compute the least cost path for reaching any AS-boundary router in its AS. Note that in the preferred embodiment, we consider the case where the selection of an AS-boundary router is based solely on cost, as described in RFC 1583. Subsequent versions of the OSPF protocol, described in RFC 2178 and RFC 2328, introduced preferences for AS-boundary routers reachable through intra-area routes. The preferred embodiment focuses on the RFC 1583 case because of the broader range of scenarios to which it gives rise. However, complying with RFC 2178 and RFC 2328, as well as future versions of the OSPF protocol, can be readily achieved, optionally with minor modifications to the steps of the methods described in this embodiment.

While a RAQ module is capable of acquiring routing information as it is known in the area with which it is associated, RAQ modules are unable to provide a global AS-level view of how routing is done. This task is the responsibility of the Route AggreGation (RAG) module 18. One RAG module is preferred, but more than one RAG module is a possible option. The RAG module 18 receives and processes the information obtained by the RAQ modules, and is described in more detail below. The RAG module may be any computing device, such as a PC, laptop, server, or individual workstation having a processor and memory.

The RAG module 18 is in substantially constant communication with many, and preferably all, of the RAQ modules in the different areas of its AS. The RAG module receives from the RAQ modules the routing information that the RAQ modules have acquired through participating in the routing protocol of their individual area. Specifically, each RAQ module forwards to the RAG module copies of all router link state advertisements, network link state advertisements, summary link state advertisements, and AS-external advertisements that they receive. The RAG module parses and processes this information to construct a complete image of how routing is carried out across the AS, and support the extraction of end-to-end (across the AS, including multiple areas) paths. Specifically, the RAG module structures the routing information associated with different areas so as to facilitate its piecing together to create end-to-end paths in response to route queries.

The AS also includes at least one Route Query (RQ) module 19 that is shown in FIG. 1 as co-located with the RAG module 18. Alternatively, the RQ module may be a separate device, such as a computing device having an input/output port or communications port and communicating with the RAG module. The RQ module 19 serves as an interface for a user, such as a network administrator, to retrieve information collected by the RAG module.

The RQ module 19 interfaces to the RAG module 18 and coordinates the process of retrieving complete path information from the data structures maintained by the RAG module. The RQ module 19 accepts as inputs an identifier for the starting point within the AS for a path or route that is to be retrieved, and an identifier for the end point or destination for the path. The identifier of the starting point can be a host name or IP address local to the AS, i.e., belonging to one of the subnets in the AS, or be in the form of an interface number belonging to one of the routers in the AS, i.e., identifying the entry point into the AS. The identifier of the desired end-point or destination will typically be in the form of a host name or IP address, and need not be associated with a device that is local to the AS. In the case of a remote end-point, the path information that is returned extends from the (local) entry point in the AS to the exit point from the AS towards the next AS that is to be used in order to reach the remote destination.

As mentioned earlier, in an AS running the OSPF protocol an internal router in an area can receive multiple types of link state advertisements, e.g., router and network link state advertisements, summary link state advertisements, and AS-external link state advertisements. Because it is possible for a RAQ module to receive multiple copies of the same advertisement, the RAQ module preferably does not automatically forward to the RAG module any advertisement it receives. Instead, the RAQ module first checks to determine if the advertisement is a new advertisement, and only if it is will the advertisement be forwarded to the RAG module. This avoids unnecessarily burdening the RAG module with duplicate advertisements.

In addition to changes caused by the receipt of an update from one of the RAQ module's neighboring routers, there are other events that can affect the routing and topology information maintained by the RAQ module. In particular, most link state routing protocols include various timer based "liveness" mechanisms to detect failures and remove out-of-date information from the topology database. The expiration of one such timer triggers the removal of a corresponding piece of information from the topology database. Such a change also needs to be reported to the RAG module to ensure that its information is consistent with that maintained by the RAQ module. In other words, the RAQ module acting as a router maintains an up-to-date view of routing and topology information in its own area, and is responsible for ensuring that this information is conveyed to the RAG module in a timely and reliable manner.

The topology database that the RAQ module builds provides it with substantially complete knowledge about routers and links (and their cost) in the RAQ module own area and the set of route entries directly reachable from routers in its area. This allows the RAQ module to readily compute shortest paths to any route entry located in its own area. As mentioned before, in addition to the detailed knowledge of its area topology and local route entries, the RAQ module also has access to two additional pieces of information. It knows the identity of all AS-boundary routers in its AS and the set of external routes they can reach together with their associated costs, and it has received summary information, from each one of the area border routers of its own area, identifying remote (in other areas) route entries and AS-boundary routers with the cost for reaching them through each area border router. The combination of detailed area information and summary information about remote areas and AS boundary routers allows a RAQ module (and any router in an area) to select the area border router that is on the shortest path towards a remote destination, as well as compute explicitly the shortest path(s) within its area for reaching the selected area border router. However, because of its limited visibility into other area, the RAQ module's ability to explicitly identify the shortest path(s) to be followed by packets addressed to a remote destination stops at the exit point, i.e., area border router, from its own area. The RAQ module cannot perform extending the shortest path(s) into subsequent areas.

The construction of complete end-to-end paths is under the responsibility of the RAG module, as it receives detailed area information from all RAQ modules and is, therefore, able to extend shortest paths from one area into the other. The approach followed by the RAG module is iterative in nature. It starts from within the area where the origin of the path(s) to be computed is located, and proceeds area by area, if needed, to discover the full path. The number of iterations needed depend on the location of the intended destination relative to the specified starting or entry point. Specifically, when referring to FIG. 2, the RAG module can return a set of paths extending across only a single area (destination 31), a set of paths consisting of both paths confined to one area and of paths crossing multiple areas (destination 32), and a set of paths that all extend across multiple areas (destination 33).

Figure 5:
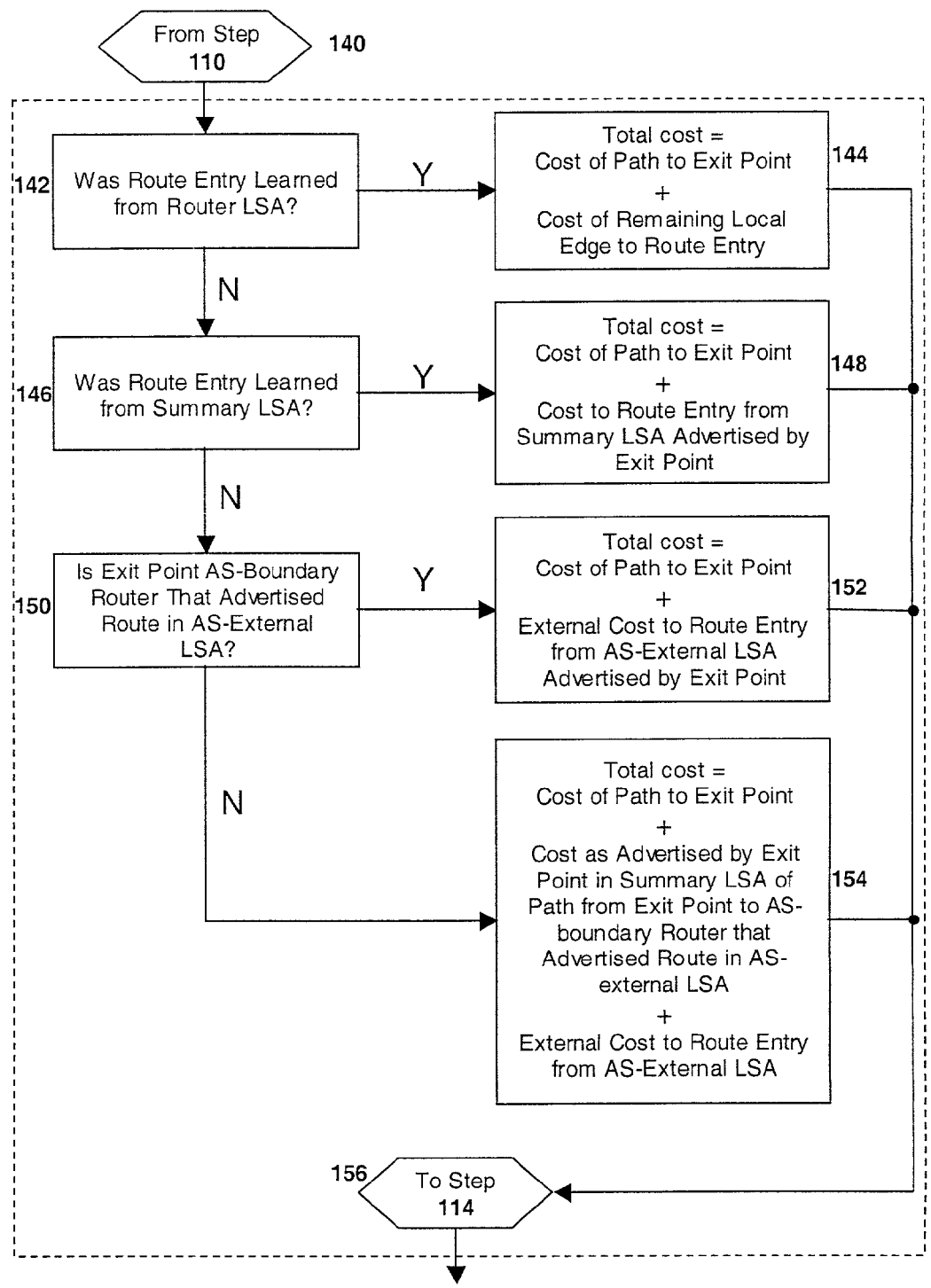
FIG. 5 illustrates exemplary steps performed by a route query module when computing the total cost of a path extending towards the destination through a given exit point of an area.
Figure 6:
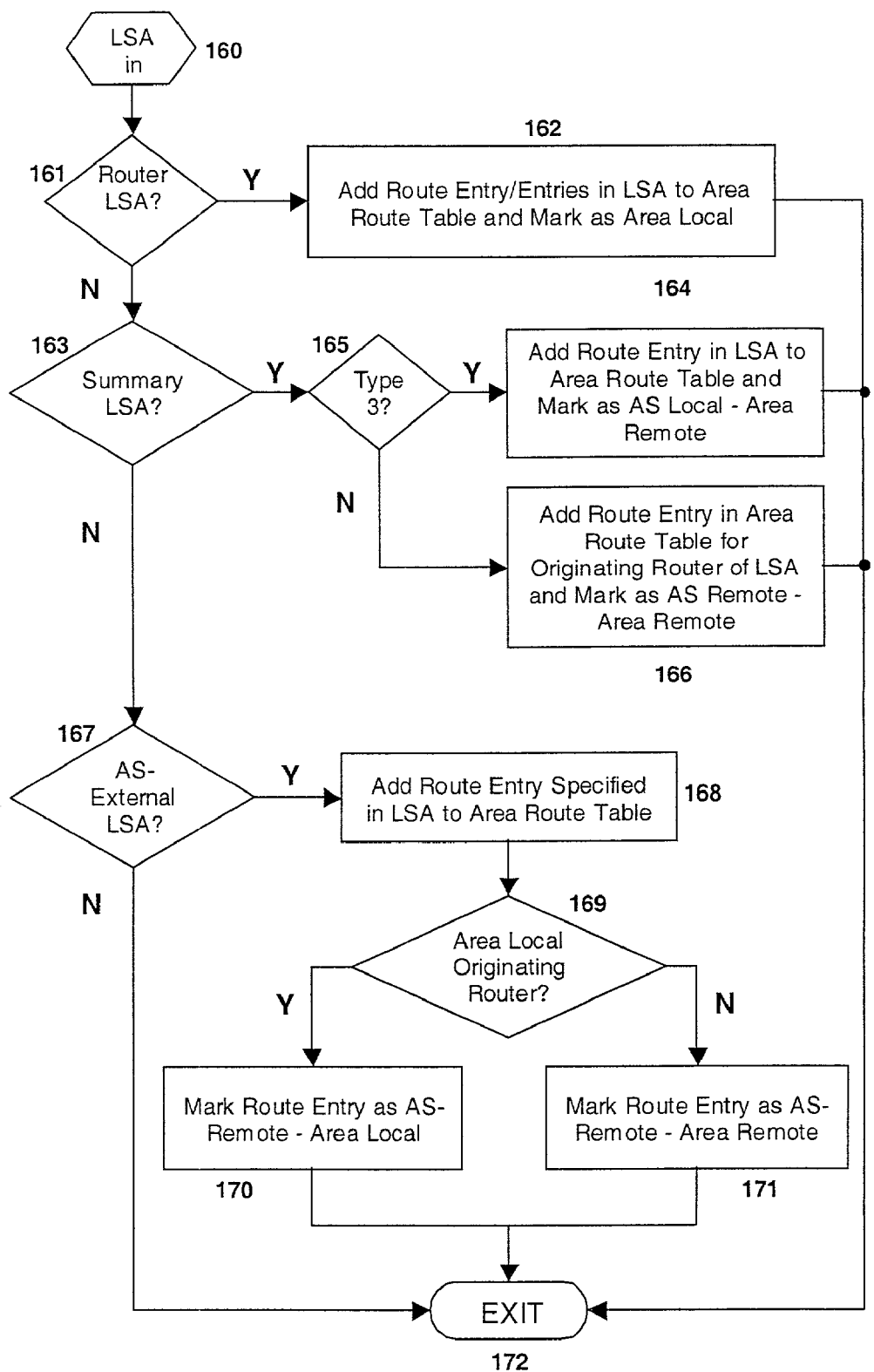
FIG. 6 illustrates exemplary steps performed by a route aggregation module when adding a route entry and its corresponding type in the route table of an area upon receipt of an advertisement in that area.
Figure 7:
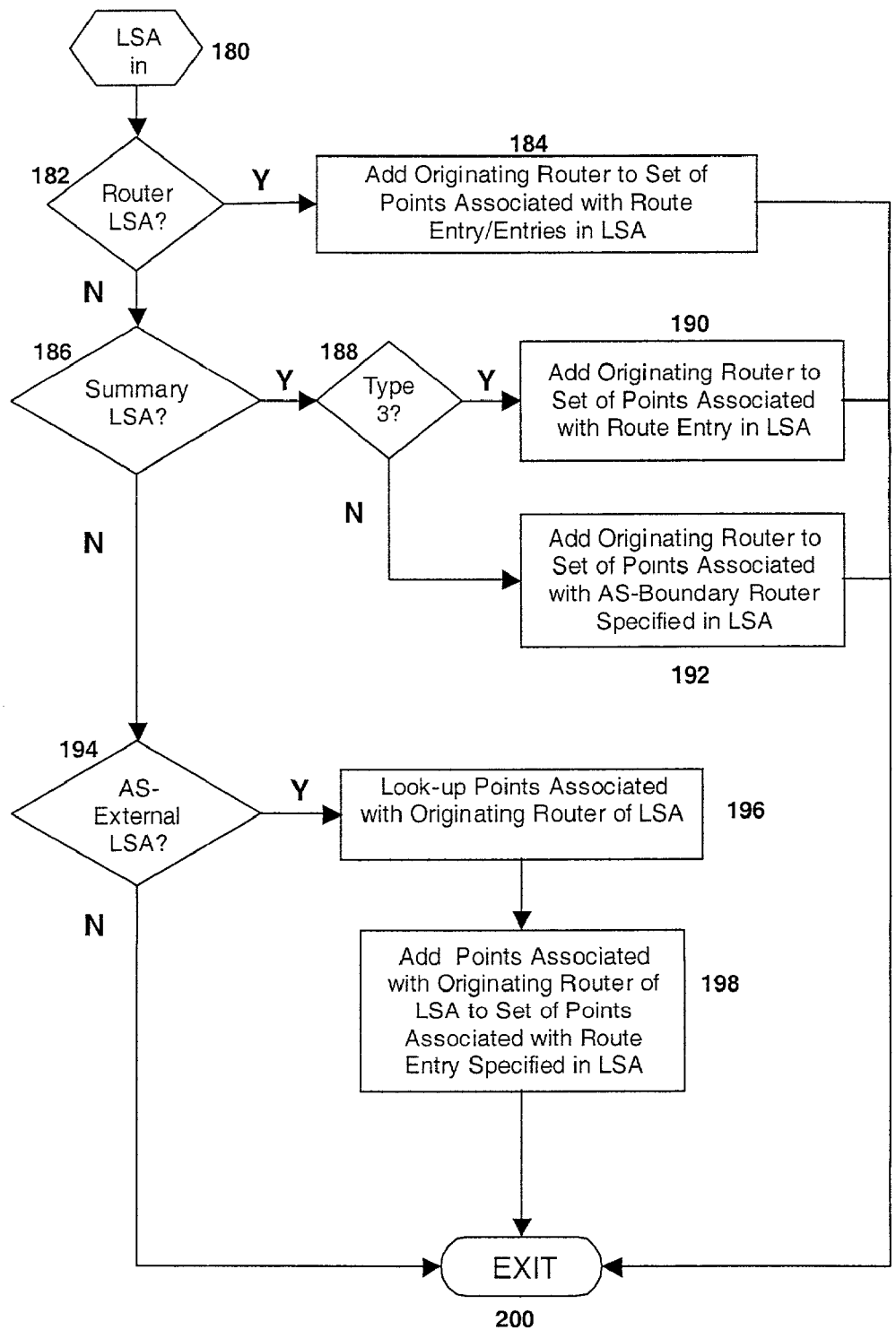
FIG. 7 illustrates exemplary steps performed by a route aggregation module upon receipt of an advertisement in an area when adding exit points for a route entry in the route table of that area.

The RAG module has at its disposal all the information available from the RAQ modules situated in the different areas of the AS, i.e., all the LSAs they have received in their respective area. The steps used by the RAG module to organize the information it receives from the LSAs forwarded by the RAQ modules in its AS are illustrated in FIG. 6 and FIG. 7. Those steps will be detailed and illustrated in the context of several path query examples. Within an area, the RAG module uses routers and network LSAs for computing shortest paths to all destinations, i.e., route entries and routers, located within the area. Summary LSAs and AS-external LSAs are used to determine how to best exit an area in order to reach a remote destination, i.e., a destination in another area or another AS. For remote destinations, once the RAG module has identified possible exit points from the area, it first computes shortest paths to reach those exit points, and then computes the total cost of the end-to-end path for reaching the destination through each exit point. This computation is carried out by adding the cost of the shortest path segment from the area entry point to the exit point, to the cost of reaching the remote destination from that exit point onwards. This latter cost component is extracted from the information available in the summary LSAs and possibly AS-external LSAs provided to the RAG module by the RAQ module located in the area. From those computations, the RAG module identifies which exit points are associated with minimum end-to-end costs, and only keeps those for extension into the next area, when computing paths to remote destinations. The RAG module then repeats this process in the next area(s) to which the remaining exit points are connected. The exit points become the entry points into the next area(s). The process terminates when there are no more exit points that are connected to a "next" area, i.e., all exit points are either directly connected to the route entry associated with the specified destination address or they are connected to a link into another AS through which the route entry associated with the specified destination address is reachable. Three representative configurations are considered in FIG. 2, which help illustrate the different steps that the RAG module goes through. The steps that are preferably followed in each one of those three cases are described next in reference to FIG. 3, FIG. 4, FIG. 5, FIG. 6, FIG. 7, and FIG. 8. An alternative approach to computing shortest paths to exit points and then determining a total cost of reaching, through each exit point, the route entry associated with the destination address, is to directly compute this total cost simply by extending the shortest path computation to include "nodes" corresponding to the route entry. Those nodes are attached to each exit point through an edge with a cost equal to the cost of reaching the route entry from the exit point. For example, in the case of route entries that are directly reachable from an exit point (router), the edge would correspond to the local link or network with a cost set to the cost advertised by the exit point (router) for that local link or network. In the case of routes in another area or AS, the edge would be a logical edge with again a cost corresponding to the cost of reaching the route as advertised by the exit point (router).

Figure 2:
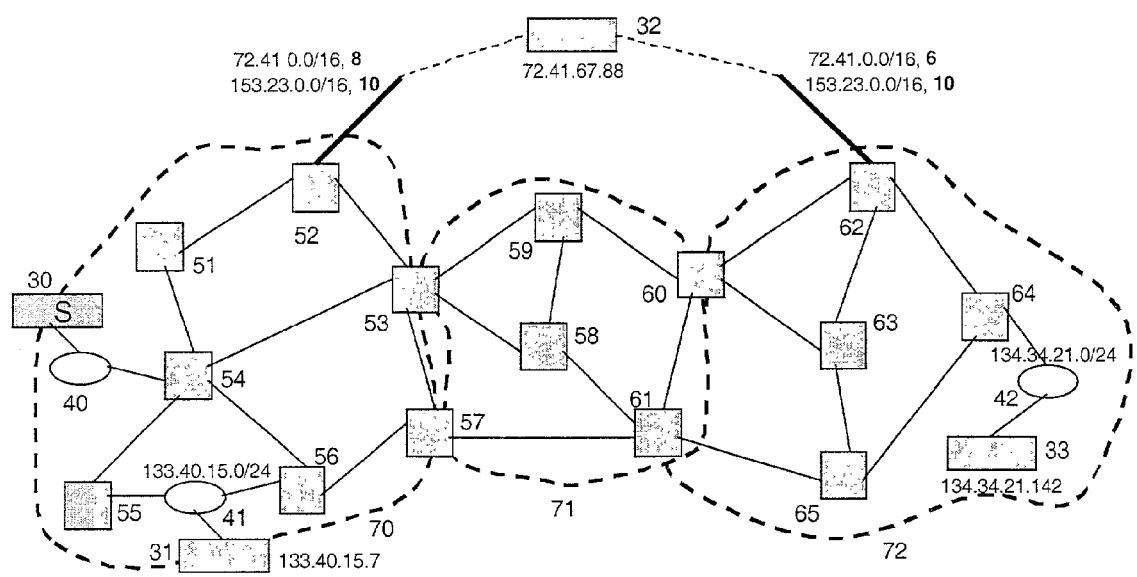
FIG. 2 illustrates different combinations origin and destinations that may be used when performing a path query in accordance with the present invention.
Figure 3:
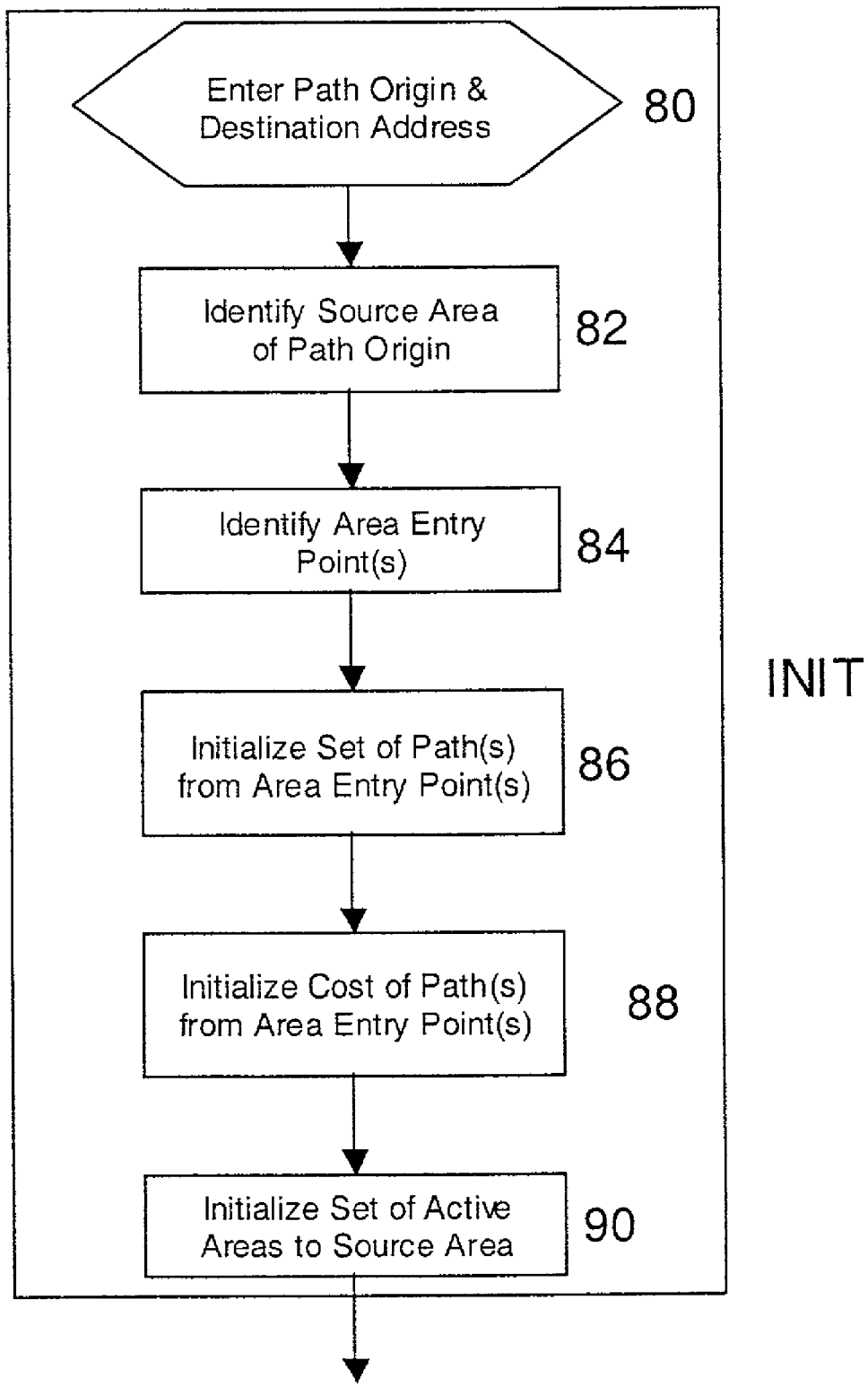
FIG. 3 illustrates exemplary initialization steps that may be performed by a route query module when initiating a new route query in accordance with the present invention.

FIG. 3 describes a number of initialization steps (INIT) that are taken in the preferred cases at the start of a path query. The first step 80 consists of specifying the starting point or origin for the path together with the intended destination address. Step 82 identifies the source area for the query, i.e., the area where the path origin is located. For example, reference to the starting point "S", 30, of FIG. 2, Step 82 would return area 70. The identification by the RAG module of the source area of a query can be readily performed using the Route Table that the RAG module maintains for each area based on the information it receives from the RAQ modules. Specifically, upon receiving the identification of the path origin, e.g., in the form of the IP address of an interface or a local host, the RAG module proceeds to query the Route Table of its different areas to identify which one contains an "Area Local" route entry associated with this address.

The process followed by the RAG module to incorporate this information into the Route Table of each area is best illustrated in reference to FIG. 6 that describes the construction of the Route Table that the RAG module maintains for each area. The Route Table of an area is constructed and possibly updated based on LSAs received from the RAQ module(s) associated with the area. As shown in FIG. 6, upon receipt of an LSA (step 160), the RAG module proceeds to determine the type of LSA that was received and updates the Route Table accordingly (step 162, 164, or 166 or 168). If the received LSA is a Router LSA (decision box 161), the route entries contained in the LSA are added to the Route Table, if not already present, and marked as "Area Local," i.e., associated with a network connected to one of the routers in the area (step 162). If the received LSA is a Summary LSA (decision box 163), the update that is performed depends on whether the LSA is a Type 3 or a Type 4 Summary LSA. In case of Type 3 Summary LSAs, the RAG module adds the route entry to the Route Table, again assuming it is not already present, and marks it as "AS Local-Area Remote," i.e., belonging to another area but within the same AS (step 164). For Type 4 Summary LSAs, the RAG module creates, if not already present, a route entry for the AS-boundary router specified in the LSA and marks it as "AS Remote-Area Remote", i.e., a route to an AS-boundary router located in a different area (step 166). Finally, if the LSA is an AS-external LSA (decision box 167), the route entry is added to the Route Table, if not present, in Step 168, and the RAG module then checks to determine if the AS-boundary router originating the LSA belongs to the area (decision box 169). If it does, the RAG MODULE marks the route entry as "AS Remote-Area Local" (Step 170), otherwise the route entry is market as "AS Remote-Area Remote" (Step 171). From the above steps, it is clear that the Route Table constructed by the RAG module for each area contains both the route entries known in each area and for each entry an indication of its "type."Primary route entry types include "Area Local," "AS Local-Area Remote," "AS Remote-Area Local," and "AS Remote-Area Remote." In addition, the Route Table also includes entries of type "Area Remote AS-boundary router" for AS-boundary routers located in remote areas.

Returning to FIG. 3, the next initialization step, Step 84, identifies the entry point(s) into the source area that is (are) associated with the path origin. For example, in the context of source S, 30, in FIG. 2, the entry point in area 70 is router 54. This identification is again readily performed using information from the Route Table, which for each route entry includes the set of routers associated with the route entry. The process used by the RAG module for constructing that information is shown in FIG. 7. As in FIG. 6, FIG. 7 shows that the processing steps followed by the RAG module differ based on the type of LSA that was received. In the case of router LSAs (decision box 182 and Step 184), the originating router is added to the list of routers maintained for the route entry. The RAG module takes a similar action for Type 3 Summary LSAs (decision box 186 and Y branch of decision box 188 and Step 190), while some additional processing is needed for the case of Type 4 Summary LSAs (N branch of decision box 188 and Step 192). For those LSAs, the RAG module first retrieves the (AS-external) route entries advertised by the AS-boundary router that was specified in the Type 4 Summary LSA, and adds the originating router of the Type 4 Summary LSA to the set of routers associated with each one of those route entries. Finally, in the case of AS-external LSAs (decision box 194), the RAG module first extracts from the Route Table the set of routers (exit points) associated with the originating router (Step 196), and adds them to the set of routers associated with the route entries contained in the AS-external LSA (Step 198). The two steps 196 and 198 are needed to distinguish between cases where the AS-boundary router originating the AS-external LSA is local to the area, and cases where it belongs to another area.

Coming back to the initialization procedure of FIG. 3, Step 86 then initializes the path(s) associated with the area entry point(s) and step 88 determines the associated cost(s). The path(s) is (are) typically initialized to the path segment (s) connecting the path origin to the area entry point(s) of Step 84. For the example of source 30 in FIG. 3, the entry point into area 70 is router 54, so that the initial path segment is of the form 30-40-54, where network 40 identifies the manner in which source 30 is attached to router 54. This information is again readily available from the Route Table maintained by the RAG module for area 70. The cost(s) of the path segment is typically set to zero (0), as it is for the example of source 30 in FIG. 2. The last initialization step, Step 90, initializes the set of active areas to contain the source area or area 70 for the example of FIG. 2.

Figure 4:
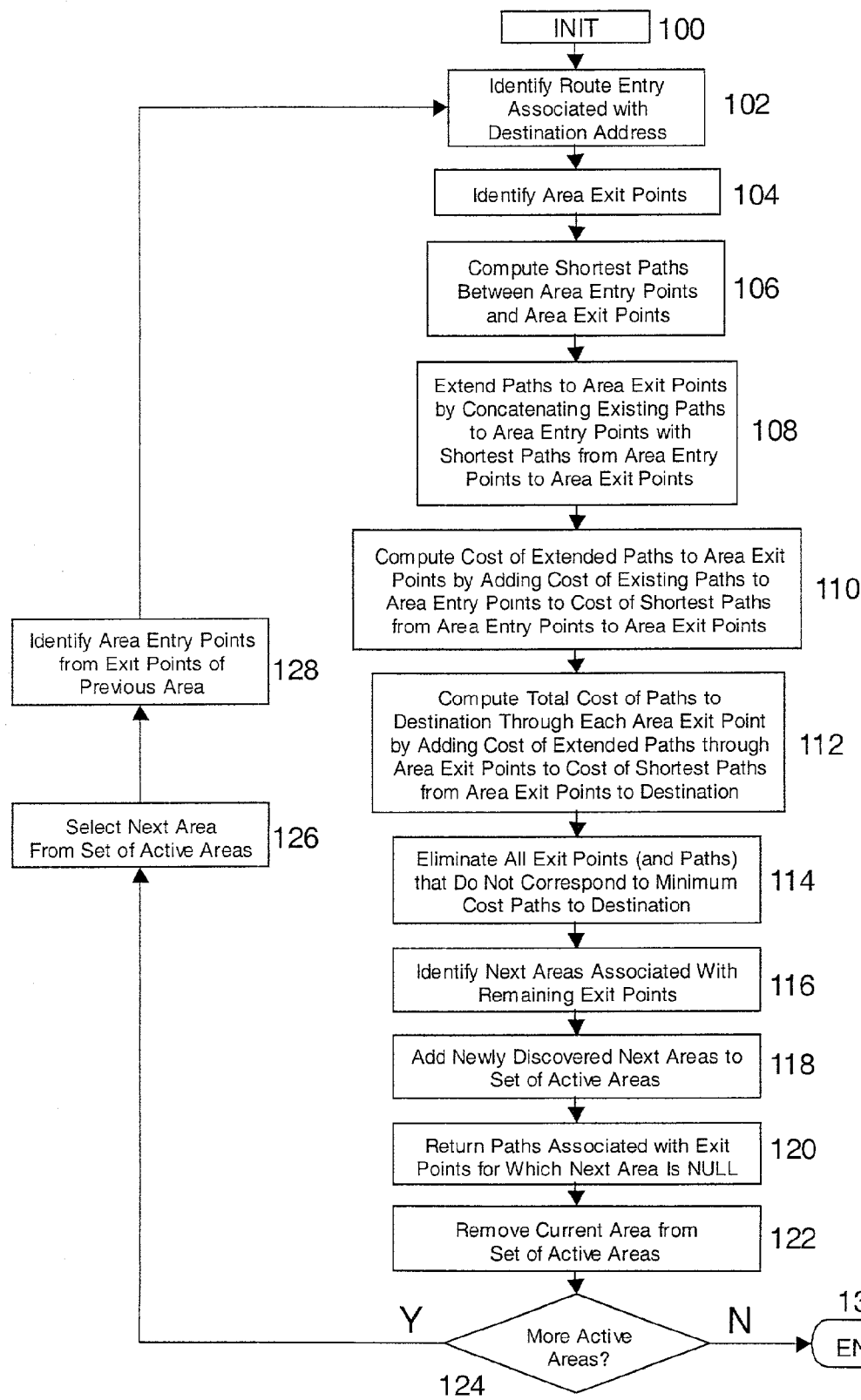
FIG. 4 illustrates an exemplary sequence of steps performed by a route query module in order to return a set of paths types in response to a route query in accordance with the present invention.

FIG. 4 describes the subsequent steps followed by a path query once the initialization steps of FIG. 3 (represented in FIG. 4 as INIT step 100) have been completed. Optionally, those steps can be repeated multiple times based on the location of the destination address and the number of areas involved in the paths used to reach it.

Consider first the case of destination 31 that belongs to area 70, which is also the origin area where the source S, 30, is located. Step 102 of FIG. 4 consists of identifying the route entry in area 70 that is associated with the destination address 133.40.15.7 of destination 31. From FIG. 2 we see that this address is associated with subnet 133.40.15.0/24, which is therefore the route entry returned by step 102. The RAG module readily performs this step by searching the Route Table of area 70 that it constructed following the steps of FIG. 6 and FIG. 7 based on the information it receives from the RAQ module serving area 70. Once this is known, the route query proceeds to step 104 that is responsible for identifying the set of exit points in area 70 through which destination 31, can be reached. In the case of destination 31, that is local to area 70, two local routers, 55 and 56, advertised a route entry for the network node 41 (130.40.15.0/24) with which the destination address 130.40.15.7 is associated, so that they are returned as the exit points through which destination 31 can be reached. Note that alternatively, network node 41 could have been returned as exit point by Step 104, and it should be obvious that the subsequent steps can be readily modified to accommodate this case. Under the assumption that routers 55 and 56 are the exit points returned by Step 104, Step 106 then computes shortest paths from the entry point in area 70, router 54, to those two routers.

Step 106 returns two shortest paths, both of cost one (1) (all links and networks are assumed to be of unit cost), one using the link between router 54 and router 55, and the other using the link between router 54 and router 56. Those two shortest paths are used in step 108 to extend the initial path "30-40-54" into two paths. The two extended paths are "30-40-54-55" and "30-40-54-56", and their cost, computed in Step 110, is still found equal to one (1) (0+1=1). Step 112 then computes for each path the total cost of reaching destination 31. This step is further detailed in FIG. 5, which illustrates the processing that is performed for each one of the paths associated with the different area exit points. In the case of destination 31, the route entry 130.40.15.0/24 with which it is associated was learned from router LSAs generated by routers 55 and 56 that both have connectivity to network 41, the route entry associated with destination 31. As a result, the answer to the question of box 142 of FIG. 5 is YES, so that the total of the path to destination 31 is computed according to Step 144, i.e., by adding the cost of reaching the two exit points, routers 55 and 56, to the cost or reaching destination 31 through network 41. Under our assumption that all links, including the links to network 41, have unit cost, the remaining cost for reaching destination 31 through routers 55 and 56 is equal to one (1) so that the total cost of the paths is found equal to two (2). The cost computations of Steps 148 and 152 that correspond to route entries either learned from Summary LSAs (box 146) or associated with AS-boundary routers (box 150), respectively, will be detailed in the context of subsequent examples.

Because both paths to network node 41 have the same minimum cost of two (2), neither path is eliminated in step 114. Step 116 determines whether additional areas need to be traversed in order to reach destination 31 through either of the two exit points, routers 55 and 56. Because destination 31 is associated with a route entry correspond to network 41, and therefore an Area-local route to area 70, there is no "next area" and Step 116 returns an empty set and Step 118 does not modify the set of active areas that still only contains the current area, area 70. Because for all exit points, the next area returned by Step 116 is "NULL," the two existing paths are returned in Step 120. Step 122 removes area 70 from the set of active areas, which then becomes an empty set. As a result, the answer to the question of Step 124 is negative, and the "N" branch is followed to termination box 130, at which point the path query completes after only one iteration through the steps of FIG. 4.

Scenarios involving multiple iterations arise when considering destinations 32 and 33 of FIG. 2, because they are located in different areas than the source S, 30. We now briefly review those two scenarios with an emphasis on the differences introduced by the multiple iterations associated with extending paths through multiple areas, and the location of the destination in another area or AS.

Destination 32 corresponds to a destination address, 72.41.67.88, that is located in another routing domain or AS altogether. This "external" address is reachable from both area 70 and area 72 through routers 52 and 62, respectively. Following the OSPF protocol, routers 52 and 62 both advertise through the entire AS, i.e., all its areas, that they can reach this external address by flooding an AS-external LSA for the corresponding external route of 72.41.0.0/16. Router 52 advertises a cost of eight (8) for reaching this external route, while router 62 advertises a cost of six (6). The OSPF protocol specifies two types of costs or metrics for external routes that allow for differentiation between costs that are compatible (type 1) with the internal cost of paths within the AS and costs that are not (type 2). In this example, we assume that both of the costs advertised by routers 52 and 62 are of type 1, so that they can be added to the internal costs of reaching either router when computing the corresponding end-to-end costs of reaching the destination. For example, from FIG. 2 we see that reaching the destination 32 through router 52 involves a shortest path with a total cost of ten (10=2+8).

The route query for destination 32 starts in pretty much the same way as that for destination 31, with Step 102 of FIG. 4 identifying route entry 72.41.0.0/16 as the one associated with the destination address. There are three possible exit points for reaching the destination from area 70, routers 52, 53, and 57. The RAG module identifies those three routers as exit points from the Route Table it maintains for area 70. We briefly review in relation to FIG. 6 and FIG. 7, how the RAG module enters this information in the Route Table. Router 52 advertises reachability to route entry 72.41.0.0/16 through an AS-external LSA that is flooded throughout the entire AS, including area 70. Routers in area 70, including the RAQ module (not shown on FIG. 4) located in that area, would therefore learn of router 52 ability to reach the external route 74.41.0.0/16. Furthermore, routers in area 70 would also know that router 52 is located in area 70 because of the router LSA that it floods in that area. As a result, in reference to FIG. 6, upon receipt of the AS-external LSA originated by router 52 for route 72.41.0.0/16, the route entry is entered by the RAG module in the Area Route Table of area 70 in Step 168. In Step 169, the RAG module determines that router 52 is local to area 70 so that the route entry is marked as "AS Remote-Area Local" in Step 170. Similarly, in reference to FIG. 7, Step 196 performs a lookup for router 52 that originated the AS-external LSA for route 72.41.0.0/16, and identifies that it is its own exit point, i.e., because it is local to area 70, so that router 52 itself is added to the list of exit points associated with route entry 72.41.0.0/16. As mentioned earlier, the identification of router 52 as belonging to area 70 is made possible through the receipt of the router LSA flooded by router 52 in area 70. Specifically, in reference to FIG. 6, the receipt of the router LSA from router 52 triggers the execution of step 162, which adds to the Route Table of area 70 all the routing entries carried in the network LSA; including the one associated with router 52. In addition, Step 184 of FIG. 7 is also executed, so that router 52 is added to the list of routers (exit points) for the route entries carried in the router LSA.

In contrast, the identification of routers 53 and 57 as exit points from area 70 for route entry 72.41.0.0/16 involves additional intermediate steps. As router 52 did, router 62 also originates an AS-external LSA for route entry 72.41.0.0/16 that is flooded through the entire AS. The RAQ module in area 70, therefore, receives the AS-external LSA and forwards it to the RAG module. When the RAG module receives the AS-external LSA originated by router 62 for route entry 72.41.0.0/16, Step 196 of FIG. 7, will return routers 53 and 57 as the two exit points from area 70 through which router 62 can be reached. This is because both routers originated a Type 4 Summary LSA for router 62. Upon receipt of this Type 4 Summary LSA, Step 166 of FIG. 6 resulted in the creation of an "Area Remote AS-boundary Router" route entry created by the RAG module in the Route Table of area 70. Furthermore, Step 192 of FIG. 7 resulted in both routers 53 and 57 being added as exit points for route entry 72.41.0.0/16. Finally, upon receiving the AS-external LSA originated by router 62 for route entry 72.41.0.0/16, Step 169 of FIG. 6 would return "NO" and the route entry that had been added to the Area Route Table of area 70 in Step 168, would be marked as "AS Remote-Area Remote" in Step 171 of FIG. 6. Note that as per the example of route entry 72.41.0.0/16, an entry in the Route Table of an area can have more than one type. Specifically, an "AS Remote" route entry can be both "AS Remote-Area Local" and "AS Remote-Area Remote" if it can be reached through AS-boundary routers located both within and outside the area. This is indeed the case for route entry 72.41.0.0/16 in area 70. The information contained in the Area Route Table for area 70 will, therefore, enable the identification of all three routers 52, 53, and 57 as possible exit points from area 70 through which destination 32 can be reached (Step 104 of FIG. 4).

Once exit points have been identified, Step 106 is executed and shortest paths are computed from the area entry point 54 to the three exit points 52, 53, and 57. This computation is similar to that performed for the route query associated with destination 31, and it returns two shortest path segments of cost two (2) for router 52, one shortest path of cost one (1) for router 53, and two shortest paths of cost two (2) for router 57. The path extensions procedure of Steps 108 and 110 again parallels what was done in the case of destination 31, and the first significant difference appears in Step 112, where the total cost of the different paths that have been computed now needs to take into account the costs for reaching route entry 72.41.0.0/16 from each one of the associated routers. Specifically, when referring to FIG. 5, the computation of the total cost of the different possible paths that have been identified will vary based on whether box 150 is exited through its Yes or No branch. In the case of the path to the exit point corresponding to router 52, box 150 is exited through its Yes branch as the exit point is (one of) the AS-boundary router(s) that advertised the route, namely router 52. In this case, the RAG module computes an end-to-end total cost for the path according to Step 152. This yields a cost of ten (10) for the path exiting through router 52 (a cost of two (2) for the portion of the path from router 54 to router 52 in area 70, and a cost of eight (8) for the external portion of the path extending from router 52 into the next AS towards route 72.41.0.0/16). The cases of the paths exiting through routers 53 and 57 are somewhat different, as box 150 is exited through its No branch since neither router 53 nor router 57 are AS-boundary routers that advertised the route. The total cost computation is then performed according to Step 154. For the path exiting through router 53, an end-to-end cost of again ten (10) is computed 53, and an end-to-end cost of eleven (11) for the path exiting through router 57. Those latter costs are obtained by adding the following three cost components, as described in Step 154: (i) the cost of the path segments internal to area 70, i.e., a cost of one (1) for the segment terminating at router 53 and a cost of two (2) for the path segment terminating at router 57; (ii) the cost of reaching router 62 from the two exit points of area 70, i.e., a cost of three (3) for both routers 53 and 57; (iii) the external cost of six (6) for reaching route 72.41.0.0/16 from the AS boundary router 62. Component (i) is obtained from Step 110 of FIG. 4, component (ii) is extracted from the summary LSAs advertised in area 70 by routers 53 and 57, and component (iii) is obtained from the AS-external LSA advertised by router 62 through the entire AS.

Step 114 is performed next and results in the elimination of router 57 as a viable exit point towards destination 32, because it does not yield a minimum cost path, i.e., it has a total cost of eleven (11) versus a cost of only ten (10) for the paths through either router 52 or router 53.

The following step, Step 116, checks the remaining exit points, routers 52 and 53, to determine if the path through them to destination 32, involves traversing another area. This is determined by first checking the type of route entry associated with the destination address in the Route Table of the current area, i.e., the route entry that was retrieved in Step 102 of FIG. 4. If the route entry is of type "Area Local" or of type "AS Remote-Area Local", then the RAG module concludes that no additional area needs to be checked, and Step 116 returns NULL as the next area for those exit points. Note that as per FIG. 7, the exit points are identified directly from the routers listed for the route entry in the Route Table. In the case of destination 32, the associated route entry in the Route Table of area 70 is 71.42.0.0/16, which is listed as being of both types "AS Remote-Area Local" and "AS Remote-Area Local." AS-boundary router 52 is identified as the exit point associated with the entry of type "AS Remote-Area Local", so that a next area value of NULL is returned in Step 116 for the exit point associated with AS-boundary router 52.

Alternatively, when the route entry is found to be either of type "AS Local-Area Remote," or "Area Remote AS-Boundary router," or "AS Remote-Area Remote," then the RAG module knows that some of the remaining exit points of Step 114 involve traversing additional areas before the destination can be reached. Those exit points correspond to area border routers, i.e., routers that advertised summary LSAs, and again from FIG. 7, they are listed together with the route entry in the Route Table. The RAG module proceeds next to identify the set of areas to which each such exit point is connected, and then determine which area(s) still need to be traversed in order to reach the intended destination address. This is done by sequentially searching the Route Tables of those areas for a route entry associated with the destination address.

Specifically, the RAG module maintains a list of all area border routers by monitoring the list of summary LSAs it receives from the different RAQ modules in the AS. For each summary LSA it receives, the RAG module adds the originating router, if it is not already present, to its list of area border routers and also includes the associated area to the list of areas to which the router is connected. Once the list of areas to which an area border router is connected has been retrieved, the RAG module then searches the Route Table of each of those areas, except for the current area, for route entries associated with the destination. The search is performed differently based on the type of the route entry associated with the destination address in the current area. This process is best illustrated in reference to FIG. 8 that describes the different cases to be considered and the processing steps involved in each of them.

Figure 8:
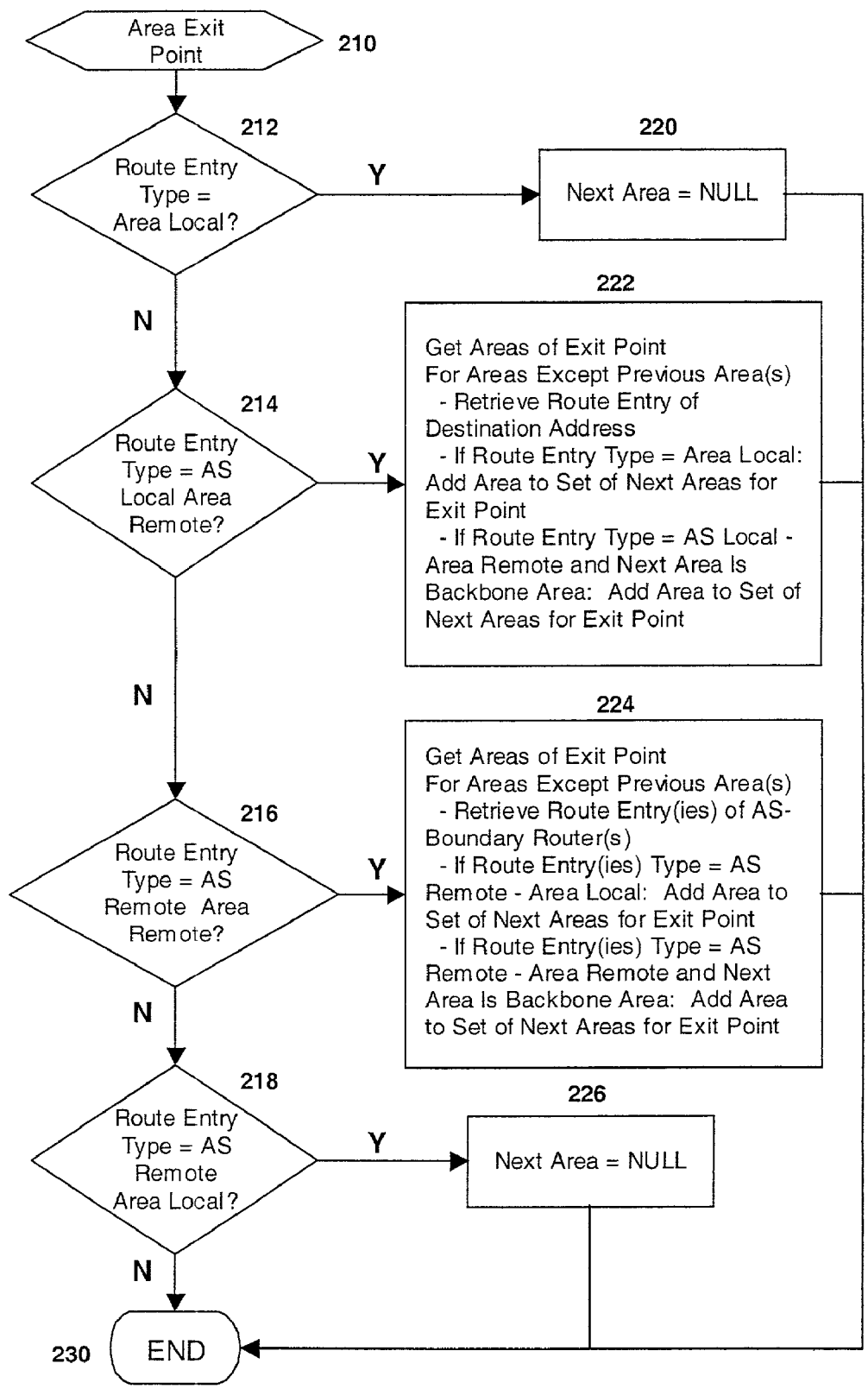
FIG. 8 illustrates exemplary steps performed by a route query module when identifying the set of next areas when extending a path towards the destination from an exit point in the current area.

FIG. 8 considers the four primary types possible for a route entry that were previously introduced, and for each type it describes how to identify the set of "next areas" associated with a given exit point. The exit point is specified in Step 210, and decision boxes 212, 214, 216, and 218, correspond to the four possible types of the route entry in the current area, namely, "Area Local," "AS Local-Area Remote," "AS Remote-Area Remote," and "AS Remote-Area Local." As alluded earlier, for both "Area Local" (decision box 212) and "AS Remote-Area Local" (decision box 218) route entries, there is no "next area" associated with the exit point so that a NULL response is returned in lieu of next area (Steps 220 and 226). The more complex cases are those involving "AS Local-Area Remote" and "AS Remote-Area Remote" route entries (decision boxes 214 and 216). For both, the next step involves retrieving the set of areas associated with the exit point and performing a number of additional checks for each one of those areas. Those additional checks are described in FIG. 8 in Steps 222 and 224 for "AS Local-Area Remote" and "AS Remote-Area Remote" route entries, respectively. Both steps start by first retrieving the set of areas associated with the exit point currently considered, and by performing a number of checks on all those areas, except areas that have been previously visited, including the current one, to determine if they are viable candidates for extending the path towards the destination. In the case of Step 222, we proceed by first retrieving for each such area the route entry associated with the address of the intended destination. The selection of an area as a viable "next area," i.e., an area into which the path needs to be extended, depends on the type of the route entry that is returned. Specifically, if the route entry is of type "Area Local", then the area is added to the set of "next areas" for the current exit point. Similarly, if the route entry is of type "AS Local-Area Remote" and the area is the backbone area, then the area is also added to the set of "next areas" for the current exit point. A similar process is followed in Step 224, except for the fact that the route entry that is retrieved for each area is the route entry associated with the AS-boundary router(s) that advertised the route entry associated with the address of the intended destination. Note that as illustrated for route 72.41.0.0/16 in FIG. 2, there can be multiple AS-boundary routers advertising an AS-external route, and therefore multiple route entries can be retrieved as part of that step. The process is repeated for all the areas associated with the current exit point, and any given area is again added to the set of next areas for the current exit point based on the type of the route entry that is returned. If the route entry is of type "AS Remote-Area Local" or of type "AS Remote-Area Local" AND the area is the backbone area, then the area is added to the set of next areas for the current exit point.

In the context of destination 32, there are two remaining exit points out of area 70, router 52 and router 53. Both are associated with route entry 72.41.0.0/16, but the route entry is of type "AS Remote-Area Local" for exit point 52 and of type "AS Remote-Area Remote" for router 53. As a result, following the steps of FIG. 8, a next area of NULL is returned for exit point 52 (decision box 218 returns YES and Step 226 is executed), while decision box 216 returns YES and Step 224 of FIG. 8 is executed for exit point 53. Step 224 first returns areas 70 and 71 as the areas associated with exit point 53, out of which only area 71 is considered for subsequent processing (area 70 is the current area). The route entry in area 71 corresponding to the AS-boundary router that advertised the route entry 72.41.0.0/16 associated with the destination address in area 70, namely router 62, is first retrieved and its type is determined. Because router 62 is located in area 72, the route entry's type in the Area Route Table of area 71 will be "AS Remote-Area Remote." Because area 71 is the backbone area of the AS of FIG. 2 (it connects other areas), the second condition of Step 224 is satisfied and area 71 is added to the list of next areas for exit point 53.

Returning to the steps of FIG. 4, once the RAG module has identified in Step 116 the set of new areas through which paths need to be extended, it updates the set of active areas in Step 118 to include those new areas and the corresponding exit points and associated path segments. In the context of the example of destination 32, this means that area 71 is added to the set of active areas. Step 120 proceeds to return the set of paths that do not need to be extended because the next area of the corresponding exit point is NULL. Step 122 completes the processing for the current area by removing it from the set of active areas, and decision box 124 determines if there are more active areas remaining that would required another iteration of the process of FIG. 4. In the context of the example of destination 32, the exit point associated with router 52 had a next area of NULL, so that the associated paths are returned in Step 120. Step 120 returns two shortest paths of cost ten (10). The first is of the form 30-40-54-51-52, and the second is of the form 30-40-54-53-52. Step 122 removes area 70 from the set of active areas, but because the set still contains area 71, the answer to the question of decision box 124 is YES and the next iteration is initiated by entering box 126, which selects area 71 (the only remaining active area) as its next area.

The next iteration of the main process of FIG. 4 starts when exiting Step 128 that simply maps the exit point(s) from the current area to entry point(s) for the next area being selected. For example, in the case of exit point 53 from area 70 with area 71 as the next area, Step 128 simply identifies router 53 as the entry point into area 71. This is similar to Step 84 of the initialization procedure of FIG. 3, and the subsequent steps follow in essentially the same manner as in the first iteration. We briefly outline their outcome in the context of the example of destination 32.

The route entry identified with destination 32 in area 71 is again 72.41.0.0/16 (Step 102), and the exit points from area 71 that are associated with this route entry include routers 53, 57, 60, and 61 (Step 104). Routers 53 and 57 are returned as they both advertise summary LSAs into area 71 for AS-boundary router 52 that originated an AS-external LSA for route entry 72.41.0.0/16. Router 53 is readily eliminated from further consideration, as it is the current entry point into area 71. Router 57 will also need to be eventually eliminated as it corresponds to reentering an area that has already been traversed (area 70), but this case requires some additional care. There are multiple possible options for identifying that router 57 needs to be eliminated as a potential exit point from area 71, and we only outline one of them. Specifically, path computation and extension through area 71 is performed following Steps 106 to 110 and returns a path of cost four (4) for exit point 57 (obtained by adding the cost of one (1) for the segment from the origin 30 to router 53 to the cost of three (3) for reaching router 57 from router 53 using only links in area 71), and paths of cost three (3) for exit points 60, and 61 (again this cost is computed in Step 110 by adding the cost of one (1) for the segment from the origin 30 to router 53 to the cost of two (2) for reaching either router 60 or 61 from router 53 using only links in area 71). Based on this, Step 112 returns a total path cost of fourteen (14) for reaching route entry 70.41.0.0/16 through the exit point associated with router 57. It is easily seen that this does not correspond to a minimum cost path (the total path cost through router 60 is ten (10)), so that exit point 57 will be eliminated in Step 114. Similarly, exit point 61 will also be eliminated in Step 114 because Step 112 returns a total cost of twelve (12) for reaching route entry 72.41.0.0/16), which again does not correspond to a minimum cost path. However, note that there may be cases where Step 114 may not be sufficient to eliminate exit points that correspond to areas that have already been traversed such as exit point 57, i.e., when the corresponding cost is equal to the minimum path cost. In those instances, the elimination of such exit points is accomplished in Steps 222 or 224 by ensuring that extensions into previously visited areas are not considered. This would ensure the elimination of router 57 since besides area 71 it is only connected to area 70, which has already been traversed by the path.

From the above, we know that after Step 114 of FIG. 4, only exit point 60 remains and it is checked for new areas in Step 116. This checking proceeds again as described in FIG. 8. Because route entry 72.41.0.0/16 was of type "AS Remote-Area Remote" in area 71, Step 224 is accessed from decision box 216, and the route entry in area 72 for AS-boundary router 62 is retrieved. The entry is found to be of type "AS Remote-Area Local" so that area 72 is added as to the set of next areas for exit point 60. As a result, the process of FIG. 4 will go through one more iteration before exit point 62 in area 72 is finally reached.

The process followed for generating the paths between source 30 and destination 33 is mostly similar to that followed for destination 32, in that it also involves traversing multiple areas and, therefore, going through multiple iterations of the main process loop of FIG. 4. There are nevertheless differences between the two destinations, as for destination 33 no path is returned until the destination area, area 72, is reached (Step 120 returns paths only in its last iteration), and multiple exit and entry points are kept at each iteration as the path query traverses areas. For example, Step 116 of the first iteration of the path query process in area 70, returns two viable exit points, routers 53 and 57. As a result, Step 128 that starts the process of extending through area 71 the path segments computed through area 70, involves two entry points into area 71. Step 106 then consists of computing shortest paths from these two entry points to all possible exit points, namely routers 60 and 61. Note that in this example, contrary to the case of destination 32, the exit points identified in Step 104 do not include any of the entry points into the area. This is because neither router 53 nor router 57 advertised in area 71 a summary LSA for route 134.34.21.0/24, the route entry associated with destination 33. After shortest paths have been computed between entry points 53 and 57 and exit points 60 and 61 in area 71, steps 108 to 112 are repeated to determine the associated costs and identify in Step 114 which paths and exit points need to be eliminated. In the context of the example of destination 33, all paths and exit points are kept as they all correspond to at least one minimum cost path. As a result, the process goes through one more iteration, this time through area 72, where the intended destination is eventually reached.

Certain portions of the invention may be performed by an automated processing system. Viewed externally in FIG. 9, an exemplary computer system designated by reference numeral 101 has a central processing unit located within a housing 108 and disk drives 103 and 104. Disk drives 103 and 104 are merely symbolic of a number of disk drives which might be accommodated by the computer system. Typically these would include a hard disk drive and optionally one or more floppy disk drives such as 103 and/or one or more CD-ROMs, CD-Rs, CD-RWs or digital video disk (DVD) devices indicated by slot 104. The number and types of drives typically varies with different computer configurations. Disk drives 103 and 104 are in fact options, and they may be omitted from the computer system used in connection with the processes described herein. An exemplary storage medium 110, which is one type of carrier that may contain program instructions and/or data, is also illustrated. Additionally, the computer system utilized for implementing the present invention may be a stand-alone computer having communications capability, a computer connected to a network or able to communicate via a network, a handheld computing device, or any other form of computing device capable of carrying out equivalent operations.

The computer also has or is connected to or delivers signals to a display 105 upon which graphical, video and/or alphanumeric information is displayed. The display may be any device capable of presenting visual images, such as a television screen, a computer monitor, a projection device, a handheld or other microelectronic device having video display capabilities, or even a device such as a headset or helmet worn by the user to present visual images to the user's eyes. The computer may also have or be connected to other means of obtaining signals to be processed. Such means of obtaining these signals may include any device capable of receiving images and image streams, such as video input and graphics cards, digital signal processing units, appropriately configured network connections, or any other microelectronic device having such input capabilities.

An optional keyboard 106 and a directing device 107 such as a remote control, mouse, joystick, touch pad, track ball, steering wheel, remote control or any other type of pointing or directing device may be provided as input devices to interface with the central processing unit.

FIG. 10 illustrates a block diagram of the internal hardware of the computer of FIG. 9. A bus 256 serves as the main information highway interconnecting the other components of the computer. CPU 258 is the central processing unit of the system, performing calculations and logic operations required to execute a program. Read only memory (ROM) 260 and random access memory (RAM) 262 constitute the main memory of the computer.

A disk controller 264 interfaces one or more disk drives to the system bus 256. These disk drives may be external or internal floppy disk drives such as 270, external or internal CD-ROM, CD-R, CD-RW or DVD drives such as 266, or external or internal hard drives 268 or other many devices. As indicated previously, these various disk drives and disk controllers are optional devices.

Program instructions may be stored in the ROM 260 and/or the RAM 262. Optionally, program instructions may be stored on a computer readable carrier such as a floppy disk or a digital disk or other recording medium, flash memory, a communications signal, and/or a carrier wave.

A display interface 272 permits information from the bus 256 to be displayed on the display 248 in audio, graphic or alphanumeric format. Communication with external devices may optionally occur using various communication ports such as 274.

In addition to the standard components of the computer, the computer also includes an interface 254 which allows for data input through the keyboard 250 or other input device and/or the directional or pointing device 252 such as a remote control, pointer, mouse or joystick.

The many features and advantages of the invention are apparent from the detailed specification. Thus, the appended claims are intended to cover all such features and advantages of the invention which fall within the true spirits and scope of the invention. Further, since numerous modifications and variations will readily occur to those skilled in the art, it is not desired to limit the invention to the exact construction and operation illustrated and described. Accordingly, all appropriate modifications and equivalents may be included within the scope of the invention.

What is claimed is:

1. A method for constructing topology and routing information in a multi-area routing domain operated according to a link state routing protocol, comprising the steps of:
acquiring topology and routing information, including route entries, for each area in the routing domain;
identifying, within each area of the routing domain, possible exit points for all route entries known in each area in the routing domain;
for all exit points identified in the identifying step as being associated with a route entry, determining a cost of a path between the exit point and its associated route entry, wherein the route entry is associated with one or more destinations in a remote non-backbone area; and
for all exit points identified in the identifying step, determining other areas, if any, to which said exit points connect.

2. A method for constructing end-to-end paths in a multi-area routing domain operated according to a link state routing protocol, comprising the steps of:
acquiring topology and routing information for a routing domain;
determining an entry point in an origin area located in the routing domain;
retrieving a route entry in the origin area, the route entry being associated with a specified destination in a remote non-backbone area;
extracting a set of exit points in the origin area through which the route entry can be reached;
for each exit point extracted in the extracting step, determining a total cost of reaching the route entry from the entry point via the exit point;
eliminating, from the set of exit points, those exit points that do not correspond to minimum total costs; and
identifying paths associated with the exit points through which the route entry is directly reachable, and eliminating those exit points from the set of exit points.

3. The method of claim 2 wherein the step of determining a total cost of reaching the route entry from the entry point via the exit point comprises:
computing shortest paths in the origin area between the entry point and each of the exit points;
determining a first cost for each of the shortest paths;
determining a second cost for reaching the route entry from each of the exit points; and
for each of the exit points, adding the first cost and the second cost to yield a total cost.

4. The method of claim 2 wherein a next area is not required to reach the specified destination from at least one of the exit points, and wherein the identifying step comprises identifying a path to the specified destination.

5. The method of claim 2 further comprising the steps of:
identifying next areas connected to the exit points remaining in the set of exit points; and
for each remaining exit point extending at least one path from the origin area into at least one next area connected to the exit point.

6. The method of claim 2 wherein the extracting step is performed by accessing a route table maintained for each area, and each route table contains a set of route entries known in the area and, for each route entry, a corresponding set of exit points and data relating to how the exit points were learned.

7. The method of claim 3 wherein the computing step is performed based on how the route entry corresponding to the specified destination address was entered in a route table for the area.

8. The method of claim 5 wherein the step of identifying at least one next area connected to an exit point comprises:
determining a type of the route entry associated with the specified destination in a current area, the current area being that within which the exit point resides;
for route entries having a type that is not local to the current area, retrieving a set of areas associated with said exit point;
from the set of areas associated with said exit point, identifying areas that are not represented in any path that has been followed to reach said exit point, and for such areas retrieving the route entry associated with the specified destination; and
determining the type of route entries that have been retrieved and, based on the route entry type, determining whether to select the area for extending the path from the associated exit point.

9. The method of claim 5, further comprising the steps of:
selecting at least one of the next areas from a current area, the current area being that within which an exit point to the next area resides;
retrieving a route entry in at least one of the next areas, the route entry being associated with the specified destination;
extracting from the next area or areas a set of next area exit points through which the route entry can be reached;
for each next area exit point, computing a total cost of reaching the route entry from that next area exit point;
eliminating from the set of next area exit points those next area exit points having shortest paths that do not correspond to minimum total costs; and
identifying the shortest paths associated with the next area exit points remaining in the set of next area exit points.

10. The method of claim 5 wherein the path extension step is repeated until there are no remaining exit points.

11. The method of claim 6 wherein route entries are added to the route table of an area based on the advertisements received from that area.

12. The method of claim 11 wherein, for each route entry added to the route table of an area, the route table also stores at least one route type based on the advertisements through which the route was learned.

13. The method of claim 6 wherein, for each route entry added to the route table of an area, the route table also stores for each route type of the route entry a set of associated exit points.

14. The method of claim 1 t wherein, for each route type of a route entry added to the route table of an area, the identity of the exit points to be stored is based on the advertisement through which the route was learned.

15. The method of claim 1 wherein:
acquiring topology and routing information comprises acquiring, by a computing device, topology and routing information;
identifying possible exit points comprises identifying, by a computing device, possible exit points;
determining a cost of a path between the exit point and its associated route entry comprises determining, by a computing device, a cost of a path between the exit point and its associated route entry; and determining other areas to which said exit points connect comprises determining, by a computing device, other areas to which said exit points connect.

16. The method of claim 2 wherein:

acquiring topology and routing information comprises acquiring, by a computing device, topology and routing information;

determining an entry point comprises determining, by a computing device, an entry point;

retrieving a route entry comprises retrieving, by a computing device, a route entry;

extracting a set of exit points comprises extracting, by a computing device, a set of exit points;

determining a total cost of reaching the route entry comprises determining, by a computing device, a total cost of reaching the route entry;

eliminating those exit points that do not correspond to minimum total costs comprises eliminating, by a computing device, those exit points that do not correspond to minimum total costs; and identifying paths associated with the exit points comprises identifying, by a computing device, paths associated with the exit points.

* * * * *